Nov. 28, 1967  E. P. DARLINGER  3,354,870
TUBE FITTING ARRANGEMENT FOR FURNACE BOTTOM
Filed Oct. 20, 1965

INVENTOR.
Edward P. Darlinger
BY
ATTORNEY 3,354,870
TUBE FITTING ARRANGEMENT FOR
FURNACE BOTTOM
Edward P. Darlinger, Barberton, Ohio, assignor to The
Babcock & Wilcox Company, New York, N.Y., a corporation of New Jersey
Filed Oct. 20, 1965, Ser. No. 498,740
7 Claims. (Cl. 122—235)

ABSTRACT OF THE DISCLOSURE

A tube fitting arrangement for interconnecting a pair of tubulous intersecting boundary walls of a furnace bottom, in which a plurality of modular fitting bodies are weld-united to one another to define an assembly having a fluid impervious exterior surface bridging the walls along their path of intersection, each fitting body having two separate internal flow passages, the outlet end of each passage being connected to a tube of a corresponding wall, and the inlet end of each passage being connected to a header means for communicating the tubes of both walls therewith, the outlet ends of the passages in each body being angularly spaced apart in accordance with the intersection angle of the walls.

---

Figure 1:
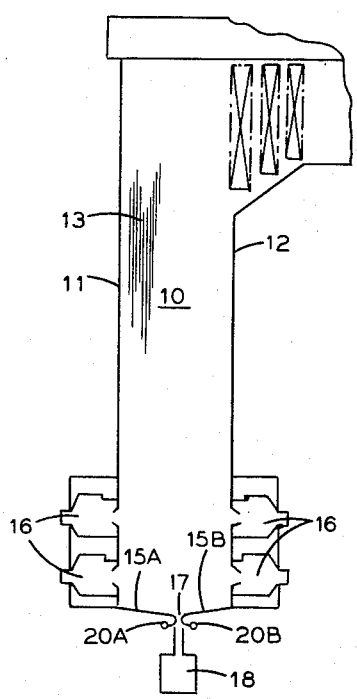

This invention relates generally to tube fittings and more particularly to a special tube fitting adapted for use in the floor of a furnace chamber wherein the molten residue of a combustion process is deposited in the lower portion thereof.

In recent years the boundary walls of furnace chambers, and particularly those of vapor generating units, have been constructed entirely of tubular members through which the fluid to be heated is circulated. This construction provides for effective heat transfer from the hot gaseous combustion products in the furnace chamber to the fluid to be heated. The walls and floor of a modern vapor generator are generally formed of a plurality of parallel contiguous tubes well-united along their lengths to form gas impervious panels. By using this type of construction, it is now possible to shop assemble large furnace boundary wall panels under rigid shop quality control standards of fabrication, thereby reducing field erection costs and minimizing the possibility of furnace gas or slag leakage. This latter advantage is particularly important since a majority of the present day furnaces of large vapor generating units are operated at superatmospheric pressure.

The primary fuel in a majority of large vapor generators is coal, and most coal burning units are of the wet bottom or slagging type where the molten slag collects in the lower portion of the furnace and flows continuously toward and through a slag tap opening in the floor and into a slag tank.

By using the above-described welded tubular panel construction for the walls and floor of a slagging furnace, the possibility of slag break-through or leakage through the tubular panels has been virtually eliminated; however, the problem of slag containment still exists to a great degree at the bottom of the furnace wherever a pair of boundary (floor or side wall) panels intersect and the flow of fluid through the tubes of the intersecting panels is not serial. For example, such an intersection of flow panels would exist in the commonly used furnace floor arrangement having a pair of oppositely upwardly sloping floor panels and a slag opening formed at the junction of these panels. In this arrangement, fluid is supplied to each panel for upward flow therethrough from a pair of corresponding headers arranged under the floor. Another common floor arrangement wherein the slag containment problem is manifest is shown in U.S. Patent No. 3,196,842, issued July 27, 1965 in the name of Huge et al., which patent discloses a construction for sealing this junction. In this arrangement, the intersecting panels are a floor panel and an upright side wall panel.

It is therefore the general object of the present invention to provide for the joining of a pair of impervious intersecting furnace boundary wall panels in a manner whereby the junction of these panels will be as invulnerable to leakage as are the panels themselves. It is a further object that this joining of panels be accomplished simply and with a minimum amount of labor so that the cost of making such junctions will be less than has heretofore been known. It is a more specific object of the present invention to provide a tube fitting specifically designed for use in joining a pair of intersecting furnace boundary tube panels. It is a further object that the use of this tube fitting simplify the design and fabrication of furnace floors to thereby reduce the cost of construction.

According to the present invention, these objects are attained in a slagging furnace which includes a pair of substantially planar, impervious boundary wall panels that intersect each other, the junction of these panels being in a portion of the furnace where molten slag is present on the inner surface of the furnace boundary walls. Each of the panels is formed with a plurality of parallel contiguous tubes weld-united along their lengths, and each panel has associated therewith a header connected for the flow of vaporizable fluid to the tubes of the panel and through these tubes in a direction away from the junction. The joining of these panels is effected by a plurality of weld-united tube fittings arranged in side-by-side relationship. Each fitting is formed with a pair of independent flow passages, each of which is arranged for flow between a tube of one panel and its corresponding header.

The present invention also embodies the tube fitting itself, which fitting is preferably a unitary forged member. The fitting includes a pair of inlet legs and a pair of outlet legs and is formed with a pair of independent flow passages, each of which has an inlet portion and an outlet portion respectively passing through one of the inlet legs and the associated outlet legs. The legs of the fitting are arranged so that the angle between the inlet legs is substantially less than the angle between the outlet legs. The four legs of the fitting are formed with outer annular surfaces defining, in part, weld grooves whereby the legs may be welded to connecting tubular members. In the preferred embodiment, the fitting is generally T-shaped, the inlet legs being generally parallel to each other and the outlet legs being oppositely disposed and substantially at right angles with the corresponding inlet legs.

For a better understanding of the invention, its operating advantages and specific objects attained by its use, reference should be had to the following description which refers to the accompanying drawings in which: FIG. 1 is a partial schematic sectional view of a vapor generator furnace embodying the present invention; FIG.

Figure 5:
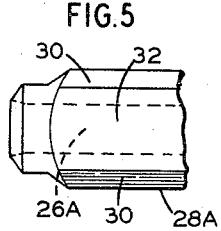
Figure 4:
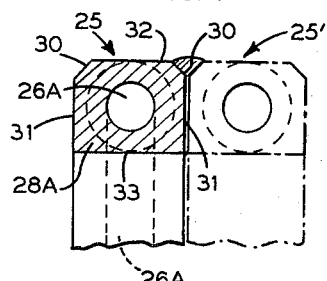
Figure 3:
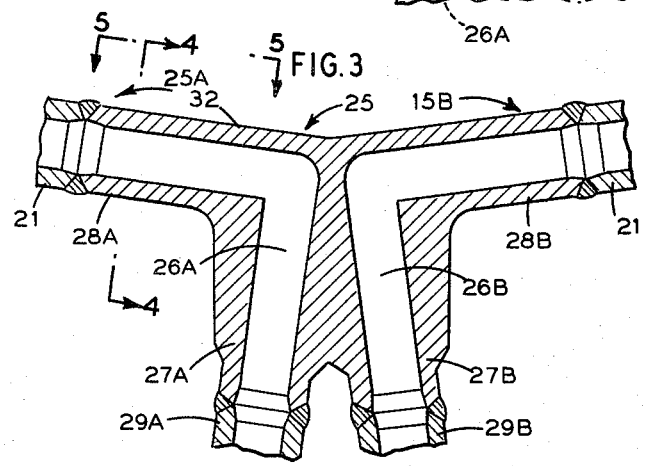

2 is a plan view of a portion of the floor of the vapor generator furnace shown in FIG. 1; FIG. 3 is an enlarged sectional view of a furnace floor fitting shown in FIG. 2; FIG. 4 is a sectional view taken along line 4—4 of FIG. 3; and FIG. 5 is a partial view taken along line 5—5 of FIG. 3.

Referring to FIG. 1, there is shown a vapor generator furnace chamber 10 of rectangular horizontal cross-section bounded by a front wall 11, an oppositely disposed rear wall 12 and a pair of side walls 13. The floor of the furnace chamber 10 is formed by a pair of oppositely sloping floor sections or panels 15A and 15B, which at their outer ends bend vertically upwardly to form the front and rear walls 11 and 12. Disposed along the front and rear walls 11 and 12 are a plurality of cyclone furnaces 16 which are designed to burn solid fuel, such as crushed coal, at high rates of heat release and to separately discharge high temperature gaseous products of combustion and separated ash residue as a molten slag into the lower portion of the furnace chamber 10 through openings in the front and rear walls. The floor of the furnace chamber 10 is formed with an opening 17 at approximately its center for the continuous discharge of molten slag therethrough to a slag tank 18.

It should be understood that the boundary walls of the furnace chamber 10 are formed of rows of tubes through which a vaporizable fluid is passed. In particular, it should be noted that vaporizable fluid is supplied to the floor sections 15A and 15B through corresponding inlet headers 20A and 20B. The boundary walls of the furnace chamber 10 are formed of a plurality of parallel contiguous tubes weld-united along their lengths to form gas impervious panel sections.

Figure 2:
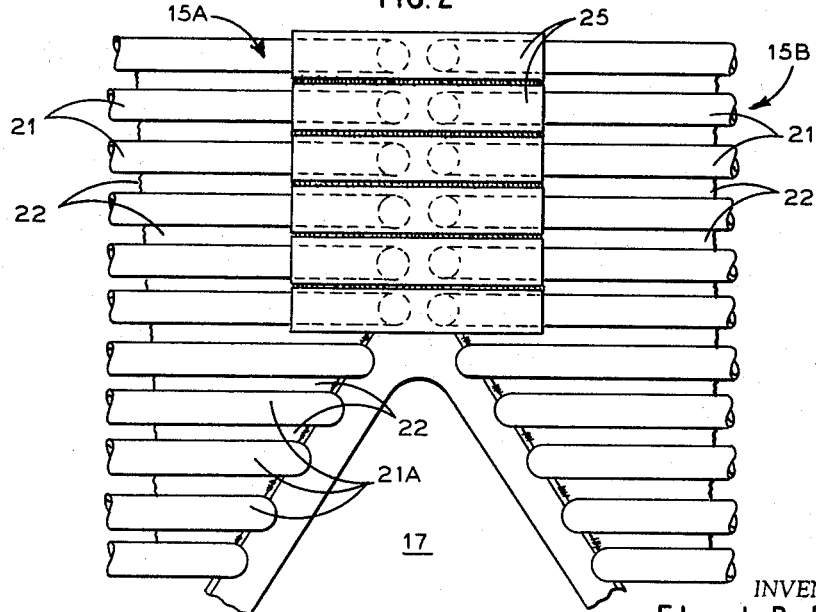

Referring to FIG. 2, the floor sections or panels 15A and 15B are, as described above, formed of a plurality of spaced parallel tubes 21, 21A weld-united along their lengths by web members 22 to render the panels impervious. It should be recognized that vaporizable fluid is supplied to tubes 21, 21A of the floor panels 15A and 15B from the corresponding headers 20A and 20B (shown in FIG. 1). The tubes 21 of the floor panels 15A and 15B are joined at their lowermost ends by means of a plurality of weld-united tube fittings 25 arranged in side-by-side relationship. At approximately the lateral center of the floor, the lower ends of tubes 21A of the floor panels 15A and 15B are bent downwardly to form the generally diamond-shaped slag tap opening 17, a half of which is shown in FIG. 2.

Referring to FIGS. 3 through 5, the fitting 25 is a unitary, forged, generally T-shaped member symmetrically formed about its central vertical planes. The fitting is formed with a pair of independent flow passages 26A and 26B of equal circular cross-sectional flow area. Each passage is formed with a right angle bend between an upright inlet portion and a laterally extending outlet portion. The inlet portions of the flow passages 26A and 26B are respectively formed by inlet legs 27A and 27B, and the outlet portions are formed by outlet legs 28A and 28B. The inlet legs 27A and 27B extend downwardly and are arranged with a slight angle between them to permit access for welding to connecting tubes. The outlet legs 28A and 28B extend in opposite directions from each other, these directions being in the planes of the furnace floor panels 15A and 15B. In the embodiment shown, the floor panels 15A and 15B are each sloped at an angle of 7½° from the horizontal so that the included angle between the outlet legs 28A and 28B is 165°.

The inlet legs 27A and 27B are formed with beveled ends which form, in part, welding grooves for connecting the inlet legs to tubes 29A and 29B which connect with the headers 20A and 20B (see FIG. 1). Each of the outlet legs 28A and 28B are formed with similar weld ends for connection to a tube 21 of the corresponding floor panel 15A or 15B.

As best shown in FIG. 4, the sides 31, the bottom 33 and the top 32 of the fitting 25 are flat, the sides 31 being arranged to abut with an adjacent member or fitting 25′ (shown in phantom). The upper edges of the outlet legs 28A and 28B are beveled as at 30 to form, in part, V-shaped welding grooves, whereby the fitting may be welded to an adjacent fitting or member such as 25′.

From the above, it will be recognized, that by use of the fittings 25, the junction of the floor panels 15A and 15B, and the connection of the floor tubes 21 of these panels for fluid flow from the inlet headers 20A and 20B, can be made with greater facility than has heretofore been possible. It should be particularly noted that the use of the fittings 25 minimizes the necessity of "custom fitting" of the furnace floor as well as the need for any special closure members or plates. It should be further noted that by using the fittings 25, the junction between the floor panels 15A and 15B is rendered as invulnerable to slag leakage as are the panels themselves, so that by use of the present invention the problems of slag containment are virtually eliminated.

The fittings 25 described above is particularly designed for use in the floor of a furnace of the type known in FIG. 1; however, it should be recognized that other fittings could be readily designed to accommodate the joining of intersecting boundary wall panels other than the arrangement shown. The above-described embodiment of the invention, is merely intended to be exemplary, and the scope of the invention disclosed herein is intended to be defined by the claims which follow.

What is claimed is:

1. In combination, a pair of substantially planar impervious boundary walls delimiting a furnace chamber, said walls intersecting each other at an angle less than 180° on the furnace side thereof, each of said walls being formed with a plurality of parallel contiguous tubes weld-united along their lengths, a plurality of modular fitting bodies weld-united to one another to define an assembly having a fluid impervious exterior surface bridging said walls along their path of intersection, each fitting body having two separate internal flow passages, each of said flow passages having an inlet end and an outlet end, the outlet ends of the flow passages associated with each fitting body being angularly spaced-apart in accordance with the intersection angle of said walls and each outlet end being connected to a tube of a corresponding wall, and header means connected to the inlet ends of each of said flow passages to accommodate the flow therethrough of fluid between said header means and the wall tubes connected to respective outlet ends of said flow passages, the inlet ends of the flow passages associated with each fitting body being angularly spaced-apart from each other, and at least one flow passage in each fitting body having inlet and outlet ends angularly spaced-apart from each other.

2. The combination according to claim 1 wherein said header means includes a pair of headers each of which is connected to the inlet ends of the flow passages associated with a corresponding wall.

3. The combination according to claim 2 wherein at least one of said boundary walls forms a part of a floor of said furnace chamber, and including means for burning fuel within said furnace chamber, said fuel burning means being disposed for depositing on said furnace chamber floor such molten residue as results from combustion of the fuel.

4. The combination according to claim 3 including means defining a slag tap opening in the floor of said furnace chamber along a portion of the intersection of said pair of walls.

5. The combination according to claim 4 wherein said modular fitting bodies are arranged in side-by-side relation to one another, and each fitting body is generally T-shaped and has flat sides.

6. The combination according to claim 1 wherein the inlet and outlet ends of each of said fitting body flow passages are angularly spaced apart from each other by approximately 90°.

7. The combination according to claim 1 wherein said fitting bodies have wall surfaces defining the inlet and outlet ends of their respective flow passages, each wall surface being formed with a recessed portion defining in part a weld groove disposed to accommodate welding of tubular conduits thereto.

References Cited

UNITED STATES PATENTS

| | | | |
|---|---|---|---|
| 1,995,034 | 3/1935 | Mayo | 122—235 |
| 2,663,325 | 12/1953 | Bede | 285—150 |
| 3,144,855 | 8/1964 | Spellman | 122—235 |

OTHER REFERENCES 1,109,039, 11/1957, German printed application.

KENNETH W. SPRAGUE, *Primary Examiner.*